(12) United States Patent
Seok et al.

(10) Patent No.: US 11,159,207 B2
(45) Date of Patent: Oct. 26, 2021

(54) NULL DATA PACKET SOUNDING FOR PREAMBLE PUNCTURE TECHNIQUES

(71) Applicant: MediaTek Singapore Pte. Ltd., Solaris (SG)

(72) Inventors: Yongho Seok, San Jose, CA (US); Jianhan Liu, San Jose, CA (US); Chao-Chun Wang, San Jose, CA (US); James Chih-Shi Yee, San Jose, CA (US)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 16/239,445

(22) Filed: Jan. 3, 2019

(65) Prior Publication Data

US 2019/0215037 A1 Jul. 11, 2019

Related U.S. Application Data

(60) Provisional application No. 62/615,559, filed on Jan. 10, 2018, provisional application No. 62/636,876, filed on Mar. 1, 2018, provisional application No. 62/637,421, filed on Mar. 2, 2018.

(51) Int. Cl.
| | | |
|---|---|---|
| *H04B 7/0417* | (2017.01) | |
| *H04B 7/0452* | (2017.01) | |
| *H04L 5/00* | (2006.01) | |
| *H04L 1/00* | (2006.01) | |
| *H04B 17/336* | (2015.01) | |
| *H04B 7/06* | (2006.01) | |

(52) U.S. Cl.
CPC ......... *H04B 7/0417* (2013.01); *H04B 7/0617* (2013.01); *H04B 17/336* (2015.01); *H04L 1/0013* (2013.01); *H04L 5/00* (2013.01); *H04B 7/0452* (2013.01)

(58) Field of Classification Search
CPC .. H04B 7/0417; H04B 7/0617; H04B 7/0452; H04L 1/0013; H04L 5/00
See application file for complete search history.

(56) References Cited

U.S. PATENT DOCUMENTS

| | | | |
|---|---|---|---|
| 10,154,520 B1 * | 12/2018 | Hedayat | ............ H04W 74/0833 |
| 2016/0330047 A1 | 11/2016 | Seok | |
| 2017/0079027 A1 * | 3/2017 | Chun | .................... H04L 1/0075 |

(Continued)

FOREIGN PATENT DOCUMENTS

| | | |
|---|---|---|
| CN | 106717100 A | 5/2017 |
| TW | 201419786 A | 5/2014 |

(Continued)

OTHER PUBLICATIONS

LAN/MAN Standards Committee of the IEEE Computer Society, Draft Standard for Information technology—Tele-communications and information exchange between systems Local and metropolitan area networks—Specific requirements, Part 11: Wireless LAN Medium Access Control (MAC) and Physical Layer (PHY) Specifications, Amendment 6: Enhancements for High Efficiency WLAN, IEEE P802.11ax TM/D2.1, Jan. 2018, pp. 1-598, XP068137573.

*Primary Examiner* — Kent Krueger

(57) ABSTRACT

Null Data Packet Sounding for preamble punctured Physical Layer Convergence Procedure Protocol Data Unit (PPDU) for efficient use of a wireless channel bandwidth where a primary service co-exists.

18 Claims, 13 Drawing Sheets

(56) References Cited

U.S. PATENT DOCUMENTS

| | | | | |
|---|---|---|---|---|
| 2017/0111924 A1* | 4/2017 | Josiam | .................. | H04L 5/0057 |
| 2017/0311325 A1* | 10/2017 | Cariou | .................. | H04B 7/0408 |
| 2017/0366329 A1* | 12/2017 | Cao | ....................... | H04L 5/0094 |
| 2018/0205442 A1* | 7/2018 | Oteri | ...................... | H04W 24/10 |
| 2019/0109684 A1* | 4/2019 | Chen | ................... | H04L 27/2605 |
| 2019/0253296 A1* | 8/2019 | Chen | ..................... | H04L 5/0076 |

FOREIGN PATENT DOCUMENTS

| | | |
|---|---|---|
| WO | 2014052879 A1 | 4/2014 |
| WO | 2015102180 A1 | 7/2015 |
| WO | 2015171895 A1 | 11/2015 |
| WO | 2015172098 A1 | 11/2015 |

* cited by examiner

| Frame Control | Duration | RA | TA | Sounding Dialog Token | STA Info 1 | ... | STA Info n | FCS |
|---|---|---|---|---|---|---|---|---|
| 2 | 2 | 6 | 6 | 1 | 4 | | 4 | 4 |

Octets:

FIG. 9A

| AID11 | Partial BW Info | Feedback Type And Ng | Disambiguation | Codebook Size | Nc |
|---|---|---|---|---|---|
| B0  B10 | B11  B24 | B25  B26 | B27 | B28 | B29  B31 |
| 11 | 14 | 2 | 1 | 1 | 3 |

Bits:

FIG. 9B

NULL DATA PACKET SOUNDING FOR PREAMBLE PUNCTURE TECHNIQUES

CROSS-REFERENCE TO RELATED APPLICATIONS

This application claims the benefit of U.S. Provisional Patent Application No. 62/615,559 filed Jan. 10, 2018, U.S. Provisional Patent Application No. 62/636,876 filed Mar. 1, 2018, and U.S. Provisional Patent Application No. 62/637,421 filed Mar. 2, 2018, all of which are incorporated herein in its entirety.

BACKGROUND OF THE INVENTION

Computing systems have made significant contributions toward the advancement of modern society and are utilized in a number of applications to achieve advantageous results. Numerous devices, such as desktop personal computers (PCs), laptop PCs, tablet PCs, netbooks, smart phones, servers, and the like have facilitated increased productivity and reduced costs in communicating and analyzing data in most areas of entertainment, education, business, and science. One common aspect of computing systems is the wireless networking of mobile devices.

For WiFi wireless networks, the supported channel bandwidth has increase from 20 MHz for 802.11a/b/g, to 40 MHz for 802.11n, and one to 160/80+0 MHz for 802.11ac/ax. In the near future, a potential new spectrum in 5 and 6 GHz. FIG. 1 illustrates the currently available channels in the 5 GHz spectrum, and the potential new channels. FIG. 2 illustrates potential new spectrum in 6 GHz. Although there are potential new channels available for use by WiFi networks, there is a need for a mechanism to efficiently use the potential new channels in the 5 and 6 GHz spectrums.

SUMMARY OF THE INVENTION

The present technology may best be understood by referring to the following description and accompanying drawings that are used to illustrate embodiments of the present technology directed toward Null Data Packet (NDP) sounding for preamble punctured Physical Layer Convergence Procedure Protocol Data Unit (PPDU).

In one embodiment, a preamble punctured Physical Layer Convergence Procedure Protocol Data Unit (PPDU) provides for efficient use of a wireless channel bandwidth where a primary service co-exists. A Null Data Packet (NDP) sounding mechanism for the preamble punctured PPDU can include a frame exchange sequence between an Access Point (AP) and a Station (STA). The AP can transmit a Null Data Packet Announcement (NDPA) and a NDP frame to the Station. The Station can respond with compressed beamforming feedback in a PPDU that includes channel state information. A mode indicator can be configured to specify one or more given punctured secondary channels. The mode indicator can be encoded in the NDPA.

In one embodiment, a beamformer can encode a preamble punctured NDPA in either a non-HT duplicated PPDU or a preamble punctured PPDU and a preamble punctured NDP. Furthermore, a preamble puncture mode indicator can be encoded in the preamble punctured NDPA. The preamble punctured NDPA and the preamble punctured NDP can be transmitted on the primary channel and the secondary channel.

In another embodiment, a beamformee can receive a preamble punctured NDPA and a preamble punctured NDP on a primary channel and a secondary channel. The beamformee can decode a preamble puncture mode indicator from the preamble punctured NDPA. The beamformee can encode a compressed beamforming feedback in a PPDU in response to the preamble punctured NDPA and preamble punctured NDP.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

Embodiments of the present technology are illustrated by way of example and not by way of limitation, in the figures of the accompanying drawings and in which like reference numerals refer to similar elements and in which:

FIGS. 9A and 9B shows a NDPA format and Station (STA) info subfield format of the NDPA, in accordance with aspects of the present technology.

DETAILED DESCRIPTION OF THE INVENTION

Figure 1:
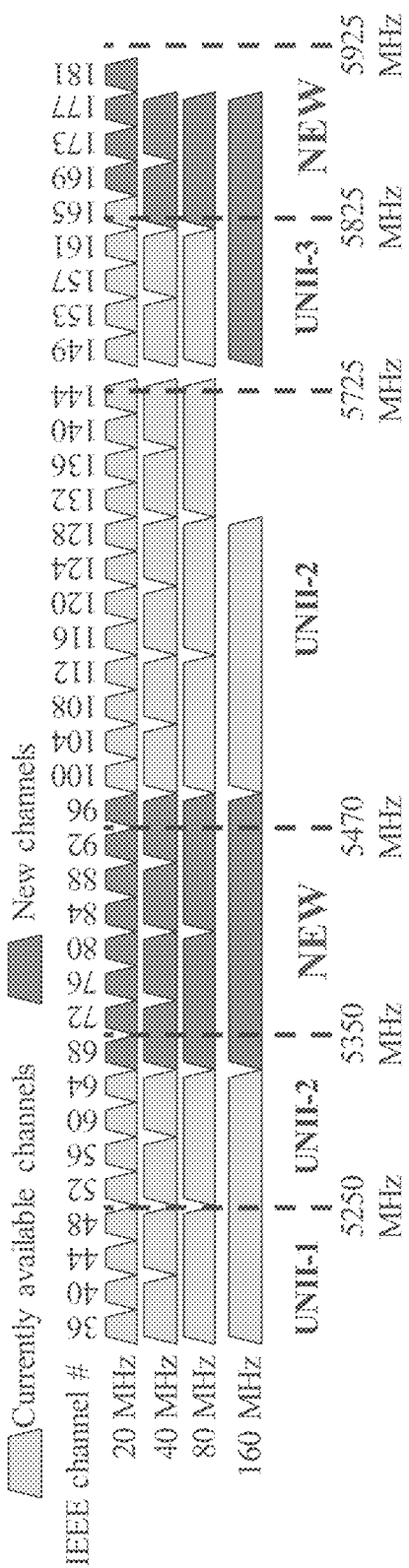
FIG. 1 illustrates currently available channels in the 5 GHz spectrum, and the potential new channels, for wireless communications.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

Some embodiments of the present technology which follow are presented in terms of routines, modules, logic blocks, and other symbolic representations of operations on data within one or more electronic devices. The descriptions and representations are the means used by those skilled in the art to most effectively convey the substance of their work to others skilled in the art. A routine, module, logic block and/or the like, is herein, and generally, conceived to be a self-consistent sequence of processes or instructions leading to a desired result. The processes are those including physical manipulations of physical quantities. Usually, though not necessarily, these physical manipulations take the form of electric or magnetic signals capable of being stored, transferred, compared and otherwise manipulated in an electronic device. For reasons of convenience, and with reference to common usage, these signals are referred to as data, bits, values, elements, symbols, characters, terms, numbers, strings, and/or the like with reference to embodiments of the present technology.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussion, it is understood that through discussions of the present technology, discussions utilizing the terms such as "receiving," and/or the like, refer to the actions and processes of an electronic device such as an electronic computing device that manipulates and transforms data. The data is represented as physical (e.g., electronic) quantities within the electronic device's logic circuits, registers, memories and/or the like, and is transformed into other data similarly represented as physical quantities within the electronic device.

In this application, the use of the disjunctive is intended to include the conjunctive. The use of definite or indefinite articles is not intended to indicate cardinality. In particular, a reference to "the" object or "a" object is intended to denote also one of a possible plurality of such objects. It is also to be understood that the phraseology and terminology used herein is for the purpose of description and should not be regarded as limiting.

For 5 GHz and 6 GHz, the potential new spectrum will likely include multi-80 MHz Basic Service Set (BSS) operations that include contiguous 160 MHz or non-contiguous 80+80 MHz, contiguous 240 MHz or non-contiguous 80+80+80 MHz, and contiguous 320 MHz or non-contiguous 80+80+80+80 MHz.

An overlapped Basic Service Set (BSS) operation in a primary 80 MHz channel is not recommended. There are a number of considerations for channel selection methods for a Very High Throughput (VHT) Basic Service Set (BSS). If an Access Point (AP) or a mesh Station (STA) starts a VHT BSS that occupies some or all channels of an existing BSS, the AP or mesh STA may select a primary channel of the new VHT BSS that is identical to the primary channel of any one of the existing BSSs. If an AP or mash STA selects a primary channel for a new VHT BSS with a 40 MHz, 80 MHz, 160 MHz, or 80+80 MHz BSS bandwidth from among the channels on which no beacons are detected during the Overlapping Basic Service Set (OBSS) scans, then the selected primary channel should meet the following conditions: it shall not be identical to the secondary 20 MHz channel of any existing BSSs with a 40 MHz, 80 MHz, 160 MHz, or 80+80 MHz BSS bandwidth; and it should not overlap with the secondary 40 MHz channel of any existing BSSs with a 80 MHz, 160 MHz, or 80+80 MHz BSS bandwidth. A STA that is an AP or mesh STA should not start a VHT BSS with a 20 MHz BSS bandwidth on a channel that is the secondary 20 MHz channel of any existing BSSs with a 40 MHz, 80 MHz, 160 MHz, or 80+80 MHz BSS bandwidth, or is overlapping with the secondary 40 MHz channel of any existing BSSs with a 160 MHz, or 80+80 MHz BSS bandwidth. In view of the above consideration, an Overlapping Basic Service Set (OBSS) that only occupies either a secondary 20 MHz or secondary 40 MHz channel may not exist very often.

In contrast, a secondary 80 MHz channel is very different. An Overlapping Basic Service Set (OBSS) that occupies any one 20 MHz channel in a secondary 80 MHz channel can exist frequently. The usability of 160 or 80+80 MHz, 240 or 80+80+80 MHz, or 320 or 80+80+80+80 decreases for cases overlapping on a secondary 80 MHz channel.

In the 5.150-5.250 GHz spectrum, the Unlicensed Nation Information Infrastructure (U-NII) low radio band (U-NII-1) was originally limited to indoor use only. Regulations required use of an integrated antenna, with power limited to 50 mW. The rules changed in 2014 to permit outdoor operation, with a maximum fixed power 1 watt, a maximum fixed EIRP 4 watts (+36 dBm) point-to-multipoint, and 200 watts (+53 dBm) point-to-point. However, strict out-of-band emission rules limit practical point-to-point power to lower levels. The U-NII mid radio band (UNII-2A), 5.250-5.350 GHz, permits both outdoor and indoor use, subject to Dynamic Frequency Selection (DFS, or radar avoidance). Regulations allow for a user-installable antenna, with power limited to 250 mW. In the U-NII-2B mid radio band, 5.350-5.470 GHz, currently 120 MHz of the spectrum is not allocated by the FCC for unlicensed use. In U-NII worldwide radio band (U-NII-2C/U-NII-2e), 5.470-5.725 GHz, both outdoor and indoor use is permitted, subject to Dynamic Frequency Selection (DFS, or radar avoidance). However, power is limited to 250 mW. This spectrum was added by the FCC in 2003 to align the frequency bands used by U-NII devices in the United States with bands in other parts of the world. The Federal Communication Commission (FCC) currently has an interim limitation on operations on channels which overlap the 5600-5650 MHz band. In U-NII upper radio band (U-NII-3; Sometimes referred to as U-NII/ISM. due to overlap with the ISM band), 5.725 to 5.850 GHz, regulations allow for a user-installable antenna, with power limited to 1 W. The 5.850 to 5.925 spectrum is presently being considered by the FCC for unlicensed use (U-NII-4. However, the 5.850 to 5.925 is presently only usable for Dedicated Short Range Communication service (DSRC) and licensed amateur radio operators. U-NII mid and U-NII worldwide band in 5 GHz are subject to dynamic frequency selection. The 6 GHz band may also be subject to some constraints, like the Dynamic Frequency Selection.

An occupied bandwidth of a primary service, such as Terminal Doppler Weather Radar (TDWR)) is less than 20 MHz. However, the usual operating bandwidth of WiFi 802.11ac and 802.11ax Basic Service Set (BSS) is 80 MHz. When 802.11ac or 802.1lax BSSs are operated in an 80 MHz channel where a primary service co-exist, the BSS needs to be operated in 20 MHz or 40 MHz to protect the primary service. In such a situation, the most popular behavior is to switch the BSS's operating channel to another 80 MHz channel instead of reducing the BSS's bandwidth from 80 MHz to either 40 or 20 MHz. As a result, the efficiency of the 80 MHz where a primary service co-exists is not high. Therefore, there is a need for a mechanism to efficiently use 80 MHz channels where a primary service co-exists.

Figure 2:
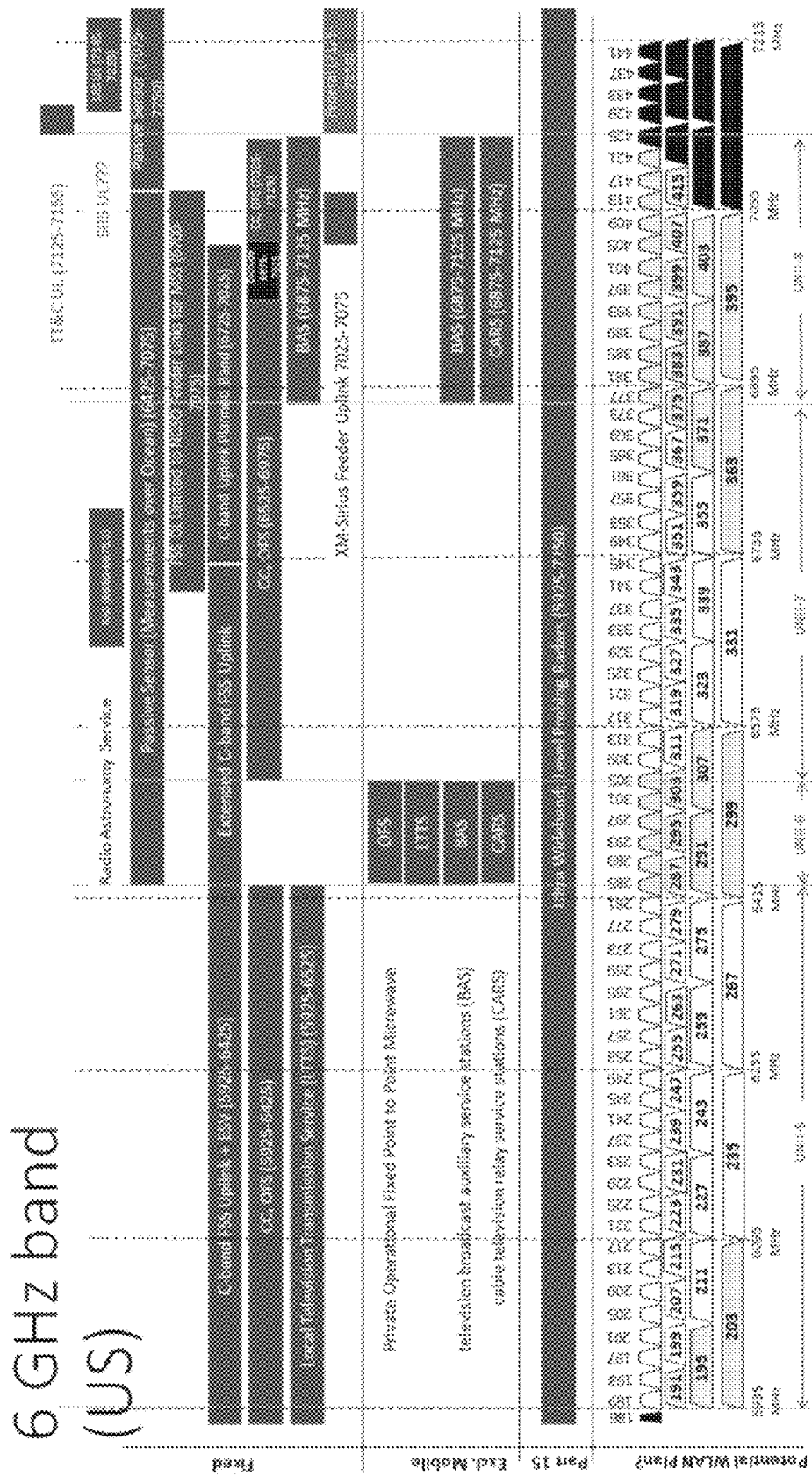
FIG. 2 illustrates potential new spectrum in 6 GHz for wireless communications.
Figure 3A:
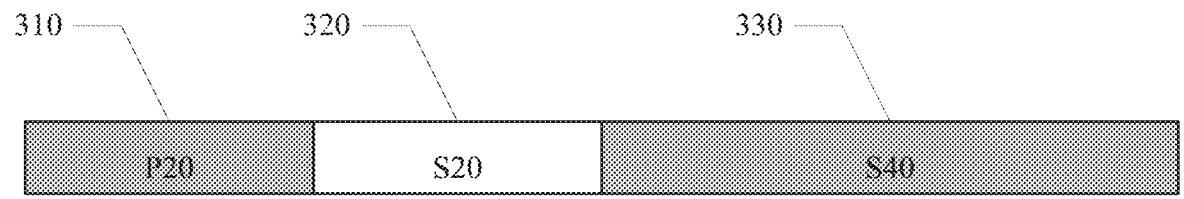
FIGS. 3A and 3B show preamble punctured Physical Layer Convergence Procedure Protocol Data Unit (PPDU) modes for 80 MHz channels, in accordance with aspects of the present technology.
Figure 3B:
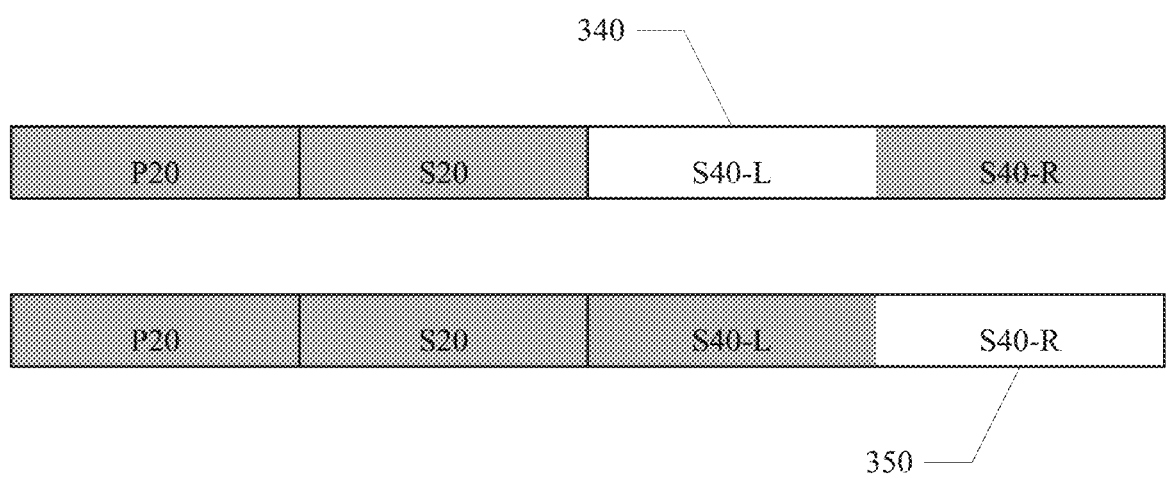

Referring now to FIGS. 3A and 3B, preamble punctured PPDU modes for 80 MHz channels, in accordance with aspects of the present technology, are shown. For an 80 MHz channel including a primary 20 MHz channel (P20) 310, a secondary 20 MHz channel (S20) 320, and a secondary 40 MHz (S40) channel 330, the secondary 20 MHz channel (S20) can be punctured in a first mode as illustrated in FIG. 2A. In a second mode, either the left 20 MHz channel (S40-L) 340 or right 20 MHz channel (S40-R) 350 of the secondary 40 MHz channel (S40) can be punctured as illustrated in FIG. 2B.

Figure 4A:
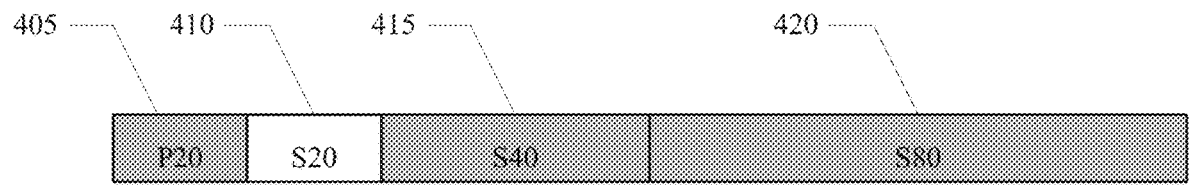
FIGS. 4A, 4B and 4C show preamble punctured PPDU modes for 160 MHz channels, in accordance with aspects of the present technology.
Figure 4B:
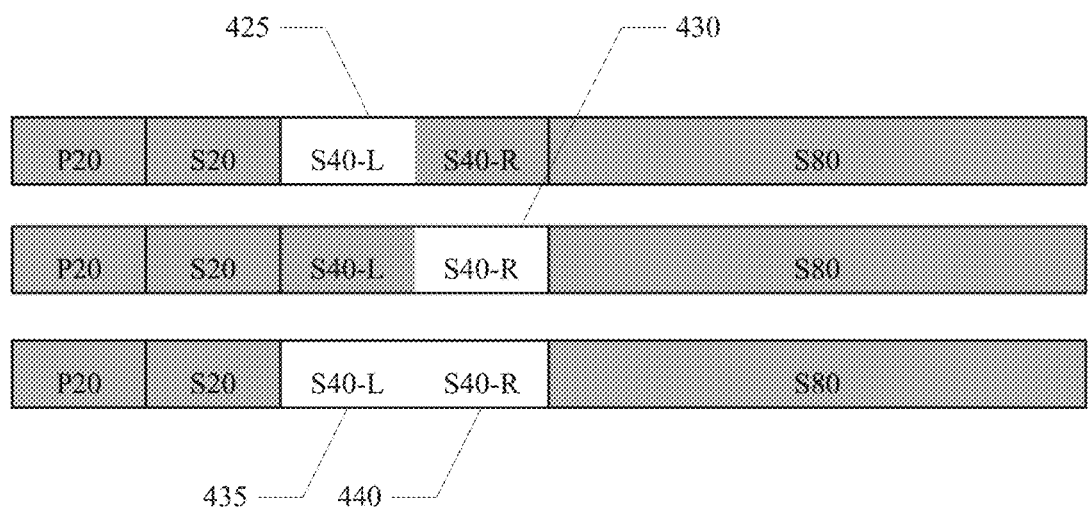
Figure 4C:
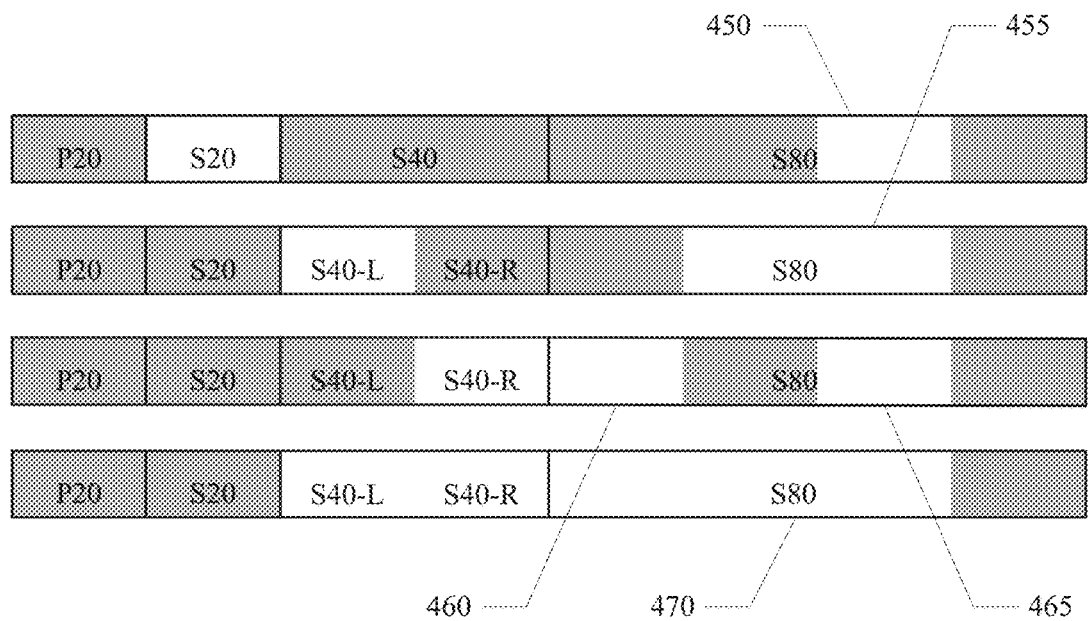

Referring now to FIGS. 4A, 4B and 4C, preamble punctured PPDU modes for 160 MHz channels, in accordance with aspects of the present technology, are shown. For the 160 MHz channel including a primary 20 MHz channel (P20) 405, a secondary 20 MHz channel (S20) 410, a secondary 40 MHz channel (S40) 415, and a secondary 80 MHz channel (80) 420, the secondary 20 MHz channel (S20) 410 can be punctured in a third mode, as illustrated in FIG. 3A. In a fourth mode, at least one 20 MHz channel (S40-L 425, or S40-R 430, or both S40-L 435 and S40-R 440) of secondary 40 MHz channel (S40) can be punctured as illustrated in FIG. 3B. In modes 3 and 4, one 450, two 455 or 460 and 465 or three 470 20 MHz channels of the secondary 80 MHz channel (S80) can also be punctures as shown in FIG. 3C.

In aspects, a mode indication in a preamble punctured PPDU can be encoded in a common fixed-length signal (SIG) field that is transmitted on the primary 20 MHz channel. In an exemplary implementation, a bandwidth field of a High-Efficiency signal field (HE-SIG-A) in a HE PPDU can be set to one of the following:

0 for 20 MHz.
  1 for 40 MHz.
  2 for 80 MI-Hz non-preamble puncturing mode.
  3 for 160 MHz and 80+80 MHz non-preamble puncturing mode.
  4 for preamble puncturing in 80 MHz, where in the preamble only the secondary 20 MHz is punctured (mode 1).
  5 for preamble puncturing in 80 MHz, where in the preamble only one of the two 20 MHz sub-channels in secondary 40 MHz is punctured (mode 2).
  6 for preamble puncturing in 160 MHz or 80+800 MHz, where in the primary 80 MHz of the preamble only the secondary 20 MHz is punctured (mode 3).
  7 for preamble puncturing in 160 MHz or 80+80 MHz, where in the primary 80 MHz of the preamble the primary 40 MHz is present (mode 4).

In mode 3 and 4, when one, two or three 20 MHz channels of the secondary 80 MHz channel are punctured, an indication of the punctured 20 MHz channels of the secondary 80 MHz channel in a preamble punctured PPDU is encoded in a user-specific and variable-length SIG field (e.g., HE-SIG-B in an HE PPDU) that is transmitted on the primary and secondary channels.

Figure 5A:
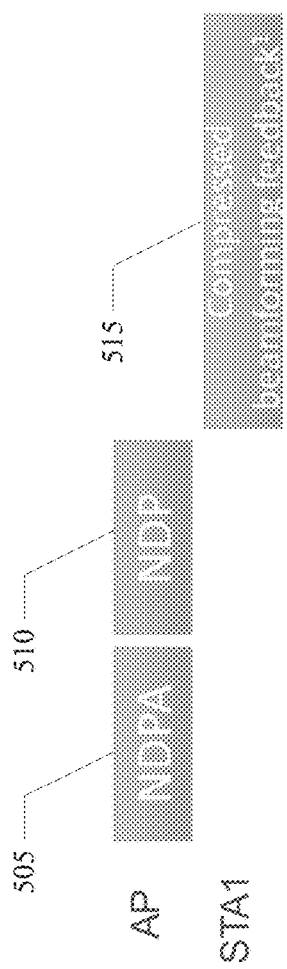
FIGS. 5A and 5B show a Null Data Packet (NDP) soundings for preamble punctured PPDU, in accordance with aspects of the present technology.
Figure 5B:
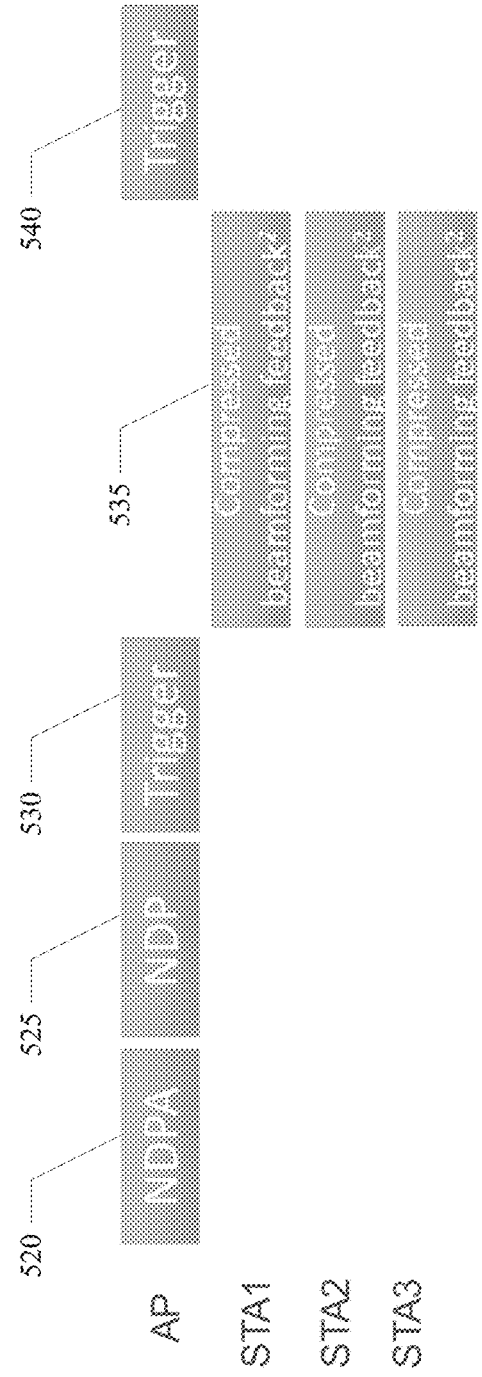

Referring now to FIGS. 5A and 5B, Null Data Packet (NDP) soundings for preamble punctured PPDUs, in accordance with aspects of the present technology, are shown. For a Single User (SU) mode, an Access Point (AP) can send a Null Data Packet Acknowledgment (NDPA) 505 followed by a NDP 510 to a station (STA). The STA can return a compressed beamforming feedback packet 515, in a SU PPDU format, back to the AP, as illustrated in FIG. 5A. The compressed beamforming feedback 515 can include channel state information. In a Multi User (MU) mode, the AP can broadcast a NDPA 520, a NDP 525 and a first trigger 530 to a plurality of STAs. The responding STAs can each return compressed beamforming feedback packets 535, in an uplink MU PPDU format, back to the AP. The AP can broadcast a second trigger 540 in response to the received compressed beamforming feedback packets, as illustrated in FIG. 5B.

Figure 6A:
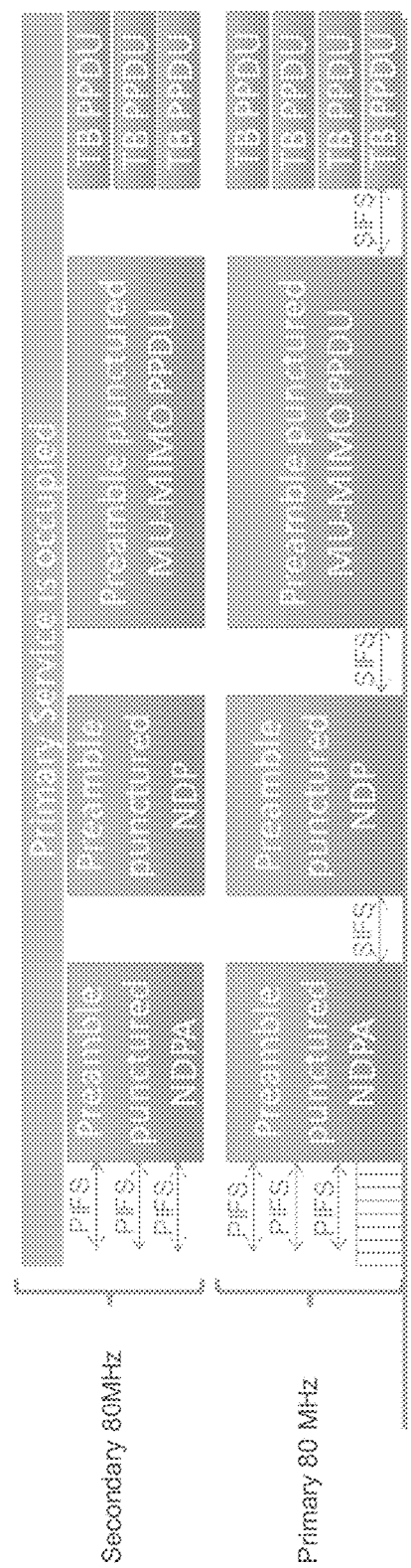
FIGS. 6A and 6B show a preamble punctured PPDU, in accordance with aspects of the present technology.
Figure 6B:
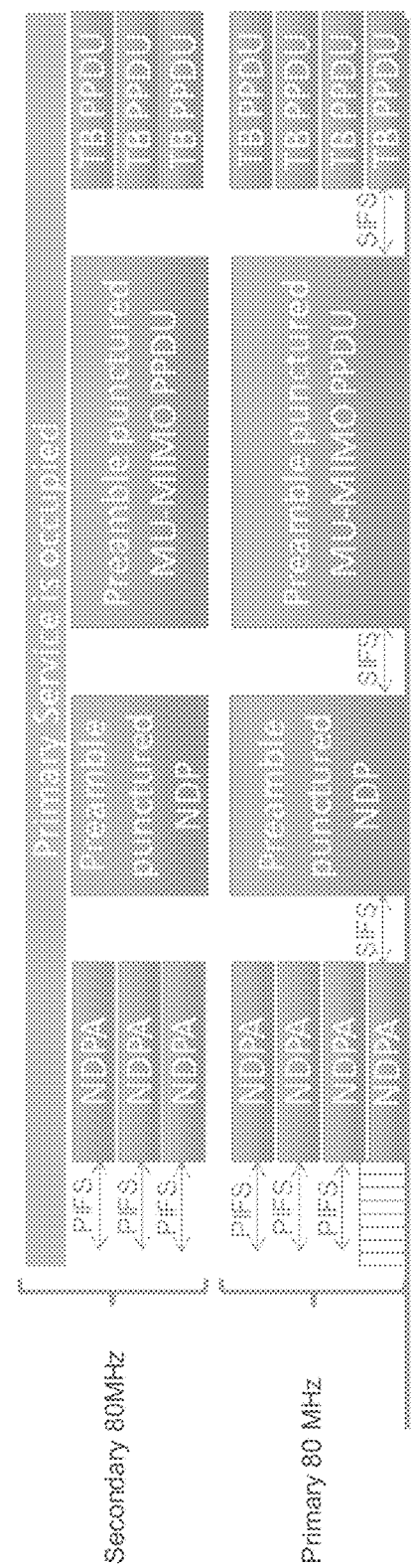

In order to support a NDP sounding for preamble punctured PPDU, a NDPA and NDP should be transmitted in a preamble punctured format. A preamble punctured NDPA can be transmitted in a preamble punctured PPDU. Referring now to FIGS. 6A and 6B, Null Data Packet (NDP) soundings for preamble punctured PPDUs, in accordance with aspects of the present technology, are shown. Through the NDP sounding for preamble punctured PPDU, a beamforming and Multi-User Multi-Input Multi-Output MU-MIMO mechanism can be allowed in a preamble punctured PPDU as illustrated in FIG. 6A. When the primary service is occupied, a preamble punctured NDPA can be transmitted on the primary and secondary channels, after the Point Coordination Function Interframe Space (PIFS). A preamble punctured NDP can then be transmitted on the primary and secondary channels, after the Short Interface Space (SIFS). After the preamble punctured NDPA and NDP, preamble punctured MU-MIMO PPDUs can be transmitted on the primary and secondary channels. Trigger Based (TB) PPDUs can be sent on each 20 MHz sub-channel of the primary and secondary channels in response to the preamble punctured MU-MIMO PPDU, after the SIFS.

Alternatively, for providing a Transmit Opportunity (TXOP) protection, a preamble punctured NDPA can be transmitted in a preamble punctured non-HT duplication PPDU, at illustrated in FIG. 6B. The preamble punctured NDPA is not transmitted on punctured 20 MHz channels. When the primary service is occupies, the preamble punctured NDPAs in the preamble punctured non-HT duplication PPDU can be duplicated and transmitted on each 20 MHz sub-channel of the primary and secondary channels after the PIFS. A preamble punctured NDP can then be transmitted on the primary and secondary channels, after the Short Interface Space (SIFS). After the preamble punctured NDPA and NDP, preamble punctured MU-MIMO PPDUs can be transmitted on the primary and secondary channels. Trigger Based (TB) PPDUs can be sent on each 20 MHz sub-channel of the primary and secondary channels in response to the preamble punctured MU-MIMO PPDU, after the SIFS. Duplication of the NDPA for transmission on each 20 MHz channel allows for use by legacy stations.

Figure 7:
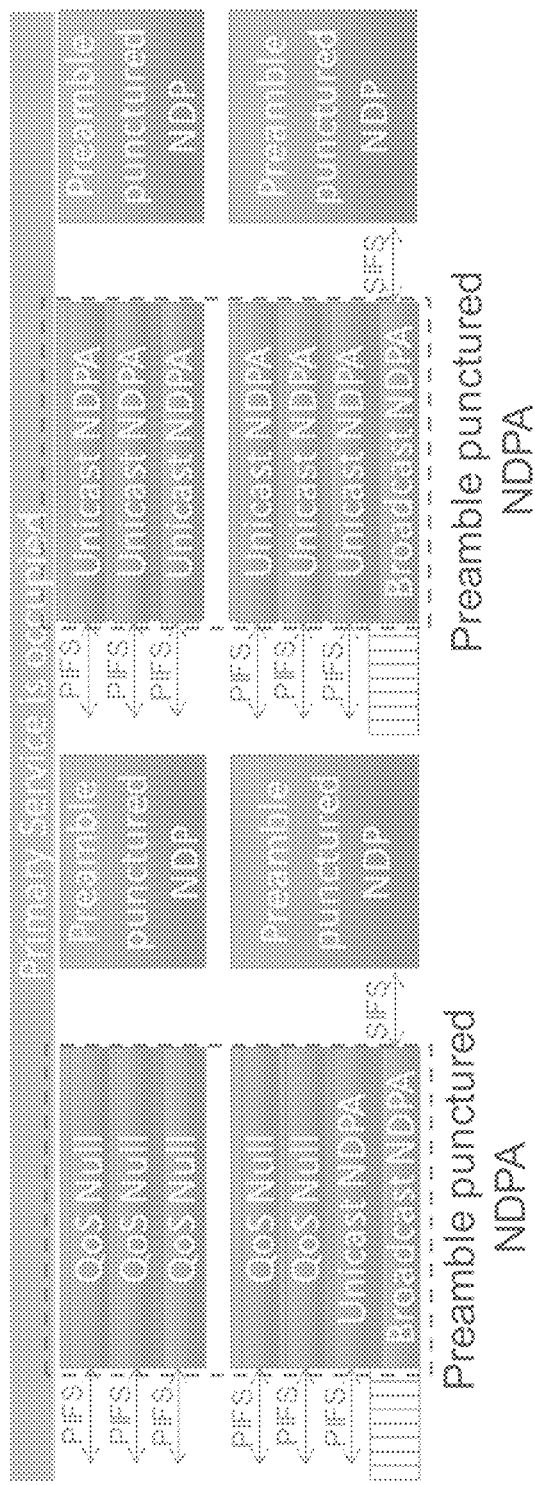
FIG. 7 shows a Null Data Packet Acknowledgment (NDPA) transmission, in accordance with aspects of the present technology.

When a NDPA is transmitted in a preamble punctured format, a mode indication can be included in a preamble punctured NDPA. The mode indication also represents the mode indication of a preamble punctured NDP transmitted after Short Interframe Space (SIFS). When a preamble punctured NDPA is transmitted in a preamble punctured PPDU, the mode indication can be encoded in a common and fixed-length SIG field of the preamble punctured PPDU. Therefore, when a non-AP STA receives a preamble punctured NDPA, the non-AP STA considers the following NDP as a preamble punctured NDP. The punctured 20 MHz channel information of the preamble punctured NDP can be obtained from the mode indication of the immediately preceding preamble punctured NDPA. When a preamble punctured NDPA is transmitted in a preamble punctured PPDU, the preamble punctured PPDU should contain only NDPA (individually addressed NDPA or broadcast NDPA). However, if another frame is carried in the preamble punctured PPDU, a frame that solicits a control response frame shall not be included in the preamble punctured PPDU, because an NDP transmission is followed after SIFS. Such frame can be a Quality of Service (QoS) Null frame. For example, if a single broadcast NDPA is transmitted in a preamble punctured PPDU, one or more QoS Null frames can be transmitted on the other Resource Units (RUs) with the broadcast NDPA together to occupy the remaining RUs that are used for the NDP sounding. An exemplary NDP sounding for preamble punctured PPDU is illustrated in FIG. 7.

Figure 8:
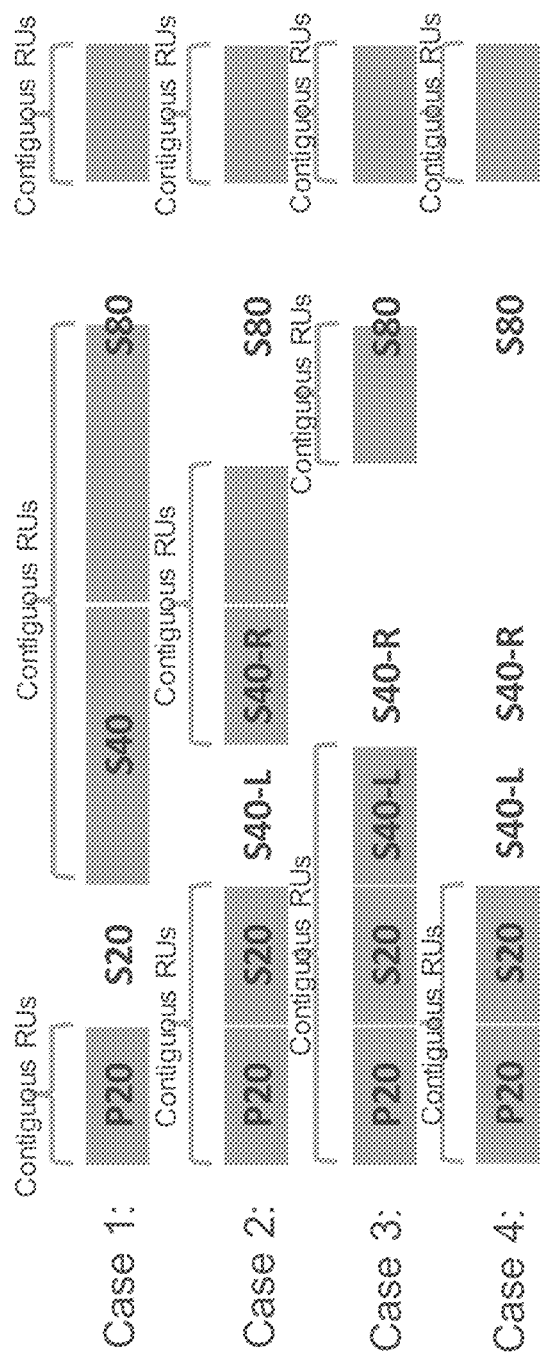
FIG. 8 shows NDP soundings for preamble punctured PPDU, in accordance with aspects of the present technology.

When a NDPA includes an indication of a punctured 20 MHz channel of a preamble punctured NDP, a partial bandwidth information subfield of the NDPA is determined from the punctured channel information. In one embodiment, a Partial BW Info field of the NDPA can indicate a frequency range within one contiguous Resource Units (RUs) among a set of a contiguous RUs in the channel bandwidth of the NDPA excluding the punctured 20 MHz channels for which a beamformer is requesting a feedback. For example, the Partial BW Info field of the NDPA can have a frequency start index and a frequency end index within one contiguous RUs among a set of a contiguous RUs as illustrated in FIG. 8. A beamformee can send a beamforming feedback measurement on the frequency specified by the Partial BW information field.

Referring now to FIGS. 9A and 9B, a NDPA format for NDP sounding for preamble punctured PPDU, in accordance with aspects of the present technology, is shown. The NDPA format can include a two octet frame control field, a two octet duration field, a six octet receiver address field, a six octet transmitter address field, a one octet sounding dialog token, 4 octets for each of n STA information field, and four octets for a Frame Check Sequence (FCS) field. The STA information field can include an 11 bit AID11 subfield, a 14 bit partial bandwidth information subfield, a 2 bit feedback type and Ng subfield, a 1 bit disambiguation subfield, a one bit codebook size subfield, and a 3 bit Nc subfield. The transmitter address field can be set to a bandwidth signaling transmitter address. The RXVECTOR parameter CH_BANDWIDTH_IN_NON_HT of a NDPA can determine the channel bandwidth of the NDPA. A Resource Unit (RU) Start Index subfield of the partial bandwidth information subfield can indicate the first 26 tone RU for which the High Efficiency (HE) beamformer is requesting feedback. A RU end index subfield of the partial bandwidth information subfield can indicate the last 26 tone RU for which the HE beamformer is requesting feedback. The 26-tone RU can be encoded in increasing order. For a 20 MHz bandwidth of a HE NDPA frame, the 26-tone RU 1 can be encoded as 0 and the 26-tone RU 9 can be encoded as 8. Values 9-127 can be reserved. For a 40 MHz bandwidth of a preamble punctured HE NDPA frame, the 26 tone RU 1 can be encoded as 0 and the 26-tone RU 18 can be encoded as 17. Values 18-127 can be reserved.

For a 80 MHz bandwidth of a preamble punctured HE NDPA frame, possibly in a preamble punctured non-HT duplicate PPDU or a preamble punctured PPDU where the bandwidth field of the HE-SIG-A of the preamble punctured PPDU is set to 4 (e.g., mode 1) or 5 (e.g., mode 2), the 26-tone RU 1 can be encoded as 0 and the 26-tone RU 37 can be encoded as 36. Values 37-127 can be reserved. For a 80+80 or 160 MHz bandwidth of a HE NDPA frame, possibly in a preamble punctured non-HT duplicate PPDU or a preamble punctured PPDU where the bandwidth field of the HE-SIG-A of the preamble punctured PPDU is set to 6 (e.g., mode 3) or 7 (e.g., mode 4), the 26-tone RU 1 in the lower 80 MHz segment can be encoded as 0 and the 26-tone RU 37 in the lower 80 MHz segment can be encoded as 36. The 26-tone RU 1 in the upper 80 MHz segment can be encoded as 37 and the 26 tone RU 37 in the upper 80 MHz segment can be encoded as 73. Values 74-127 can be reserved. For 80+80 MHz, feedback may not be requested for the gap between the 80 MHz segments.

Figure 10:
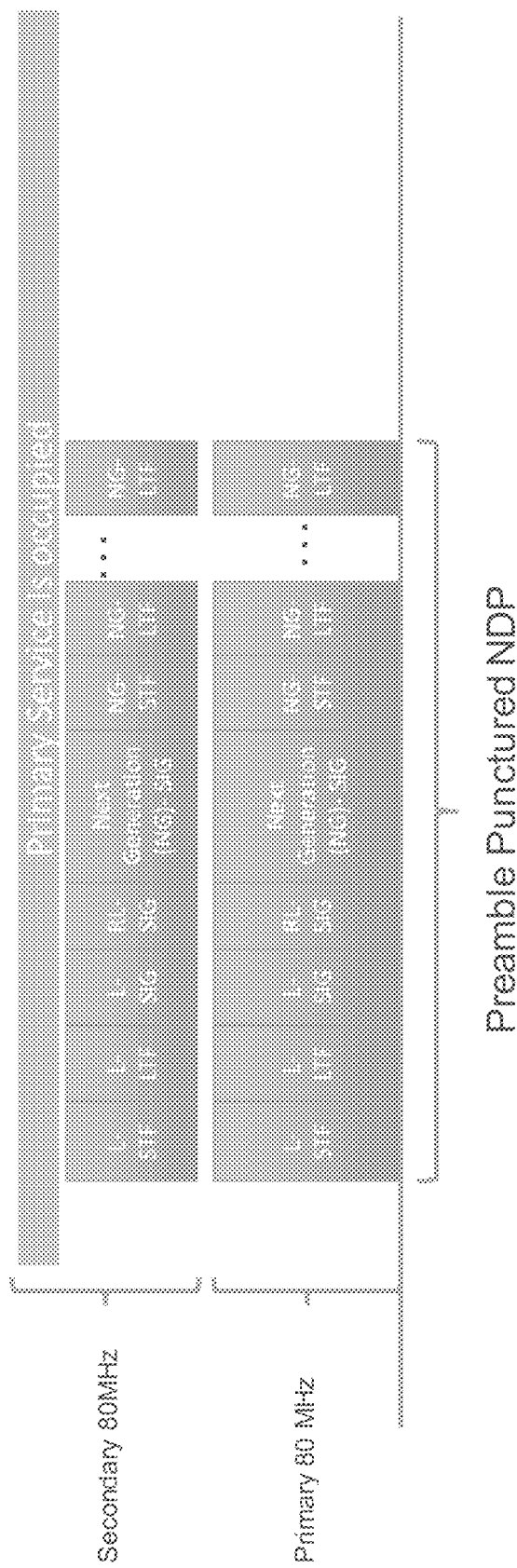
FIG. 10 shows a preamble punctured NDP, in accordance with aspects of the present technology.

When a NDPA has an indication of punctured 20 MHz channels of a preamble punctured NDP, the NDP structure can be as illustrated in FIG. 10. The Single User (US) PPDU format can be used for a NDP. The bandwidth field of the SIG field in a NDP can be set to one of the following:

0 for 20 MHz.
1 for 40 MHz.
2 for 80 MHz non-preamble puncturing mode.
3 for 160 MHz and 80+80 MHz non-preamble puncturing mode.
4 for preamble puncturing in 80 MHz, where in the preamble only the secondary 20 MHz is punctured (mode 1).
5 for preamble puncturing in 80 MHz, where in the preamble only one of the two 20 MHz sub-channels in secondary 40 MHz is punctured (mode 2).
6 for preamble puncturing in 160 MHz or 80+800 MHz, where in the primary 80 MHz of the preamble only the secondary 20 MHz is punctured (mode 3).
7 for preamble puncturing in 160 MHz or 80+80 MHz, where in the primary 80 MHz of the preamble the primary 40 MHz is present (mode 4).

Figure 11:
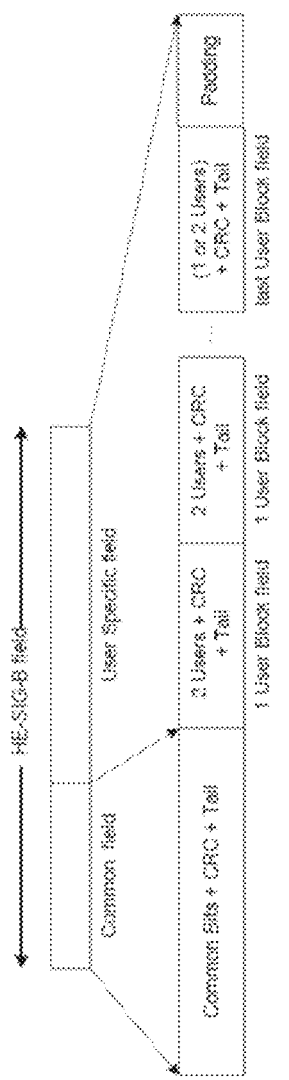
FIG. 11 shows a High Efficiency signal field (HE-SIG-B) encoding, in accordance with aspects of the present technology.

Alternatively, when a SIG field of the preamble punctured NDP has indication information of punctured 20 MHz channels of a preamble punctured NDP, a user-specific and variable-length SIG field (e.g., HE-SIG-B in an HE PPDU) can carry the indication information of the punctured 20 MHz channels. The MU PPDU format can be used for a NDP. The format of an exemplary HE-SIG-B in an HE MU PPDU for preamble punctured NDP is illustrated in FIG. 11. A Resource Unit (RU) allocation subfield in the common field of HE-SIG-B can consist of 8 bits that indicate the RU assignment in the frequency domain of a 20 MHz PPDU bandwidth (BW). The assignment can index the size of the RUs and their placement in the frequency domain. The RU allocation subfield can indicate the number of user fields in a 20 MHz BW within the HE-SIG-B content channel. The number of user subfields can indicate number of users multiplexed in the RUs indicated by the arrangement. For RUs of size greater than or equal to 106 tones that support Multi User Multi-Input Multi-Output (MU-MIMO), the number of user fields can indicate the number of users multiplexed using MU-MIMO.

In one embodiment, when a received HE MU PPDU is determined as a NDP, based on the length field of the L-SIG, the user specific field of the HE-SIG can include the following STA-ID) subfield. If the receiver vector (RXVECTOR) parameter APEP_LENGTH or PSDU_LENGTH is equal to 0, the received PPDU is a NDP. The Station Identifier (STA-ID) subfield in the user field of the user specific field of HE-SIG-B can indicate whether the RU assignment in the frequency domain mapped by the user field is puncture or not. If the RU assignment in the frequency domain mapped by the user field is punctured, the STA-ID subfield can be set to 2046. In other words, a beamformer is not requesting a feedback on the RU mapped by the user field of which the STA-ID subfield is set to 2046.

If the RU assignment in the frequency domain mapped by the user field is not punctured, the STA-ID subfield can be set to 0 (or another pre-determined value other than 2046). In other words, a beamformer is requesting a feedback on the RU mapped by the user field of which the STA-ID subfield is set to 0.

In another embodiment, the STA-ID subfield in the user specific field of HE-SIG-B can indicate an Association Identifier (AID) of a beamformee from which a beamformer is requesting a feedback on the RU mapped by the user field. If the RU assignment in the frequency domain mapped by the user field is punctured, the STA-ID subfield can be set to 2046. In other words, a beamformer is not requesting any feedback on the RU mapped by the user field of which the STA-ID subfield is set to 2046.

Figure 12:
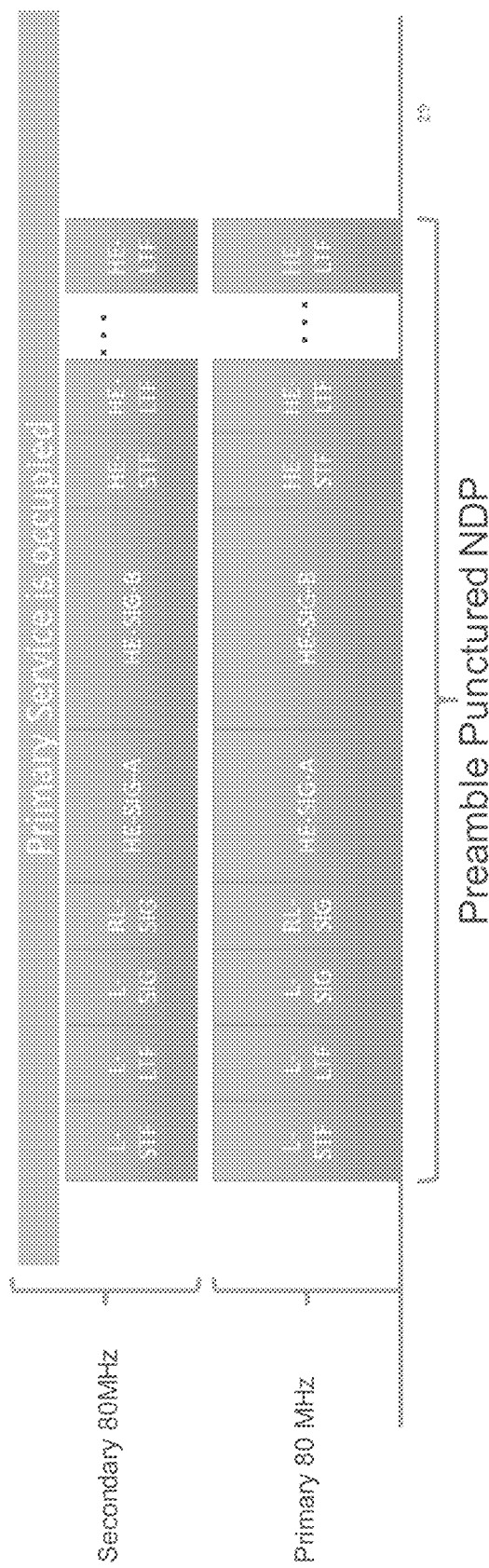
FIG. 12 shows a preamble punctured NDP, in accordance with aspects of the present technology.
Figure 13:
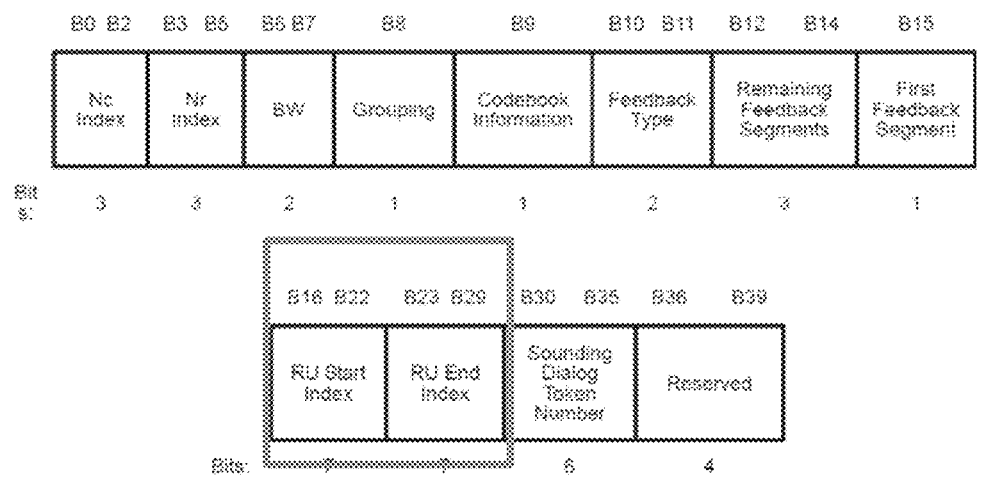
FIG. 13 shows a HE Multi-Input Multi-Output control field, in accordance with aspects of the present technology.

When the HE-SIG-B of the preamble punctured NDP has an indication information of punctured 20 MHz channels of a preamble punctured NDP, a NDP structure is as illustrated in FIG. 12. The bandwidth field of the HE-SIG-A in a NDP is set to one of the following:

0 for 20 MHz
1 for 40 MHz
2 for 80 MHz non-preamble puncturing mode
3 for 160 MHz and 80+80 MHz non-preamble puncturing mode
4 for preamble puncturing in 80 MHz, where in the preamble only the secondary 20 MHz is punctured
5 for preamble puncturing in 80 MHz, where in the preamble only one of the two 20 MHz sub-channels in secondary 40 MHz is punctured
6 for preamble puncturing in 160 MHz or 80+80 MHz, where in the primary 80 MHz of the preamble only the secondary 20 MHz is punctured.

When a beamformer requests beamforming feedback from multiple contiguous Resource Unit (RUs), a beamformee sends a plurality of beamforming feedbacks of which each is obtained from a contiguous Resource Unit (RUs). The MIMO control field in a beamforming feedback frame can specify a frequency start index and a frequency end index within each contiguous RUs. In a first embodiment, a plurality of lists of the RU start index subfield and the RU end index subfield in the HE MIMO control field can be contained in the HE MIMO control field for specifying a feedback range within each contiguous RUs, as illustrated in FIG. 11. In a second embodiment, a plurality of the HE MIMO control fields can be contained in the beamforming feedback frame. Each HE MIMO control field specifies a feedback range within each contiguous RUs. In a third embodiment, a plurality of the beamforming feedback frames can be aggregated in an Aggregate Media Access Control Protocol Data Unit (A-MPDU). Each beamforming feedback frame can provide a beamforming feedback within each contiguous RUs.

In another embodiment, a frequency start index and a frequency end index in the MIMO control field in the beamforming feedback frame covers the punctured 20 MHz channels as well. Accordingly, the compressed beamforming report information can include the compressed beamforming feedback Matrix V for subcarriers within the punctured 20 MHz channels. However, the compressed beamforming feedback Matrix V for subcarriers within the punctured 20 MHz channels is ignored by an HE beamformer. An average Signal to Noise Ratio (SNR) of space-time steam 1 to Nc in the compressed beamforming report information can be calculated over all data subcarriers not within the punctured 20 MHz channels of the preamble punctured NDP. The average SNR of space-time stream 1 can be 8 bits for encoding the signal-to-noise ratio at the beamformer for space-time stream 1 averaged over all data subcarriers not within the punctured 20 MHz channels. The average SNR of space time stream Nc can be 8 bits for encoding the signal-to-noise ratio at the beamformee for space-time steam 1 averaged over all data subcarriers not within the punctured 20 MHz channels.

The foregoing descriptions of specific embodiments of the present technology have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is intended that the scope of the invention be defined by the claims appended hereto and their equivalents.

What is claimed is:

1. A wireless network beamforming method comprising:
   encoding a preamble punctured Null Data Packet Announcement (NDPA) for a new basic service set (BSS):
   encoding a preamble punctured Null Data Packet (NDP) for the new BSS;
   wherein the preamble punctured NDPA includes a preamble puncture mode indicator;
   transmitting the preamble punctured Procedure Protocol Data Unit (PPDU) including the preamble punctured NDPA and the preamble punctured NDP on the primary channel and the secondary channel for the new BSS, wherein the secondary channel for the new BSS overlaps with a secondary channel of an existing BSS: and
   receiving a PPDU carrying a compressed beamforming feedback frame, wherein the compressed beamforming feedback frame contains a plurality of beamforming feedbacks of which each is obtained from a contiguous Resource Unit (RUs).

2. The wireless network beamforming method of claim 1, wherein the preamble punctured NDPA is duplicated and transmitted on each sub-channel of the primary channel and each sub-channel of the secondary channel.

3. The wireless network beamforming method of claim 2, wherein the duplicated preamble punctured NDPA is not transmitted on a punctured sub-channel.

4. The wireless network beamforming method of claim 1, the preamble puncture mode indicator of the preamble punctured PPDU carrying the NDPA also represent the mode indicator of the NDP transmitted after a Short Interframe Space (SIFS).

5. The wireless network beamforming method of claim 4, wherein the beamforming feedback includes an average Signal to Noise Ratio (SNR) of space-time streams calculated over all data subcarriers not within the punctured 20 MHz channels of the preamble puncture NDP.

6. The wireless network beamforming method of claim 1, wherein a partial bandwidth information field of the preamble punctured NDPA indicates a frequency range within one contiguous Resource Units (RUs) amount a set of contiguous RUs in a channel bandwidth of the preamble punctured NDPA excluding a punctured sub-channel for which a beamformer is requesting a feedback.

7. The wireless network beamforming method of claim 6, wherein the partial bandwidth information field is included in a Station (STA) information subfield of the preamble punctured NDPA.

8. The wireless network beamforming method of claim 1, wherein a bandwidth field of a Next-Generation (NG) Signal (SIG) in the preamble punctured NDP includes preamble puncture mode indicator of a punctured sub-channel.

9. The wireless network beamforming method of claim 1, wherein a user-specific and variable length signal field carries indication information of a punctured secondary channel.

10. The wireless network beamforming method of claim 9, wherein a Station Identifier (STA-ID) field in the user-specific and variable length signal field indicates whether a Resource Unit (RU) assignment in the frequency domain mapped by the user-specific and variable length signal field is punctured or not.

11. The wireless network beamforming method of claim 9, wherein a Station Identifier (STA-ID) in the user-specific and variable length signal field indicates an Association Identifier (AID) of a beamformee for which a beamformer is requesting feedback on a Resource Unit (RU) mapped by the user-specific and variable length signal field.

12. The wireless network beamforming method of claim 11, wherein, when a beamformer requests beamforming feedback from multiple contiguous Resource Units (RUs), a Multi-Input Multi-Output (MIMO) control field in a beamforming feedback frame specifies a frequency start index and a frequency end index within each contiguous RU.

13. The wireless network beamforming method of claim 12, wherein a plurality of beamforming feedback frames are aggregated in an Aggregated Media Access Control Protocol Data Unit (A-MPDU).

14. The wireless network beamforming method of claim 12, wherein a frequency start index and a frequency end index in the Multi-Input Multi-Output (NEMO) control field in the beamforming feedback frame covers the punctured secondary channel.

15. A wireless network beamforming method comprising:
receiving a preamble punctured Physical Layer Convergence Procedure Protocol Data Unit (PPDU) on a primary channel and one or more secondary channels for a new basic service set (BSS), wherein at least one secondary channel of the new BSS overlaps with a secondary channel of an existing BSS;
decoding a preamble punctured Null Data Packet Announcement (NDPA) in the preamble punctured PPDU;
decoding a preamble punctured. Null Data Packet (NDP) in the preamble punctured PPDU;
decoding a preamble puncture mode indicator in a signal field of the preamble punctured Null Data Packet (NDP) in the preamble punctured PPDU;
encoding a compressed beamforming feedback in a preamble punctured Multi-User Multi-Input Multi-Output (MU-MIMO) PPDU in response to the preamble punctured NDPA and preamble punctured NDP; and
transmitting the preamble punctured MU-MIMO PPDU on the primary channel and the one or more secondary channels.

16. The wireless network beamforming method of claim 15, further comprising:
receiving a Trigger Based (TB) PPDU on each sub-channel of the primary channel and each sub-channel of the secondary channel.

17. The wireless network beamforming method of claim 15, wherein the preamble punctured NDPA is received on each sub-channel of the primary channel and each sub-channel of the secondary channel.

18. The wireless network beamforming method of claim 17, wherein the preamble punctured NDPA is not received on a punctured sub-channel of the primary channel.

* * * * *